United States Patent [19]

Ngo

[11] Patent Number: 4,753,983

[45] Date of Patent: Jun. 28, 1988

[54] POLYMERIC MATRIX FOR AFFINITY CHROMATOGRAPHY AND IMMOBILIZATION OF LIGANDS

[75] Inventor: That T. Ngo, Irvine, Calif.

[73] Assignee: Bioprobe International, Inc., Tustin, Calif.

[21] Appl. No.: 860,603

[22] Filed: May 7, 1986

[51] Int. Cl.[4] .................... C08F 283/00; C12N 11/06
[52] U.S. Cl. ................................. 525/54.1; 525/54.11; 435/178; 435/179; 435/180; 435/181; 530/417; 530/811; 530/812; 530/816
[58] Field of Search ............................. 525/54.11, 54.1; 526/238.1; 435/178, 179, 180, 181; 527/300; 530/417, 811, 812, 816

[56] References Cited

U.S. PATENT DOCUMENTS 4,195,128  3/1980  Hildebrand et al. ............... 435/179
4,415,665  11/1983  Mosbach et al. ................... 435/179

OTHER PUBLICATIONS

Axen et al., *Acta. Chem. Scand*, B29:471–474 (1975).
Nilsson et al., *Biochem. Biophys. Res. Comm.*, 102:449–457, (1980).
Nilsson et al., *Eur. J. Biochem.*, 112:397–402 (1980).
Mukaiyama et al., *Chem. Lett.*, 1159–1162, (1975).
Chem. Abstracts 86:138863r, 1977.
Chem. Abstracts 87:21667j, 1977.
Chem. Abstracts 89:197106f, 1978.
Chem. Abstracts 91:101557w, 1979.
Chem. Abstracts 101:73041c, 1984.
Porath et al., "Immobilized Euzymes, Methods in Enzymology", (Mosbach, Ed.) vol. 44, pp. 19–45, Academic Press, New York, 1976.

*Primary Examiner*—Delbert R. Phillips
*Assistant Examiner*—Nathan M. Nutter
*Attorney, Agent, or Firm*—Nilsson, Robbins, Dalgarn, Berlinger, Carson & Wurst

[57] ABSTRACT

A matrix useful for immobilizing organic ligands, such as biologically active materials, is prepared by reacting a hydroxyl group containing polymer with polyethyleneimine.

24 Claims, 2 Drawing Sheets

POLYMERIC MATRIX FOR AFFINITY CHROMATOGRAPHY AND IMMOBILIZATION OF LIGANDS

BACKGROUND OF THE INVENTION

1. Field of the Invention

This invention relates to affinity chromatography. In one of its more particular aspects, this invention relates to a matrix for use in affinity chromatography and in the immobilization of ligands.

The need for purifying various biologically active materials in a facile manner has long been appreciated. Early methods of enzyme purification, for example, were cumbersome and time consuming. Recently it has been found that biologically active materials can be purified by a process which involves immobilization of the biologically active material, which will be referred to herein as a ligand, upon a suitable polymeric matrix, followed by separation of the immobilized ligand from the mixture in which it is present. The ligand can then be used in its immobilized form, if desired, or it can be released from the matrix on which it is immobilized by suitable chemical treatment and used in its non-immobilized form. The discovery of methods for covalently bonding ligands to polymeric matrices has advanced the practice of enzymology, immunology and various other biological techniques.

2. Prior Art

One of the first methods for immobilizing biological ligands involved treatment of a polymer containing hydroxyl groups with an activating agent such as cyanogen bromide, CNBr. The activated polymer could then be used to directly bind various biological ligands to the polymer by means of covalent bonds. Porath et al. describe several chemical activation methods, including the CNBr method, in Porath, et al., "Immobilized Enzymes", *Methods in Enzymology*, K. Mosbach, Ed., Vol. 44, pp. 19-45, Academic Press, New York (1976).

Most of the early methods for activating polymers containing hydroxyl groups were subject to certain disadvantages which made their widespread use impractical. In particular, CNBr activation procedures suffer from the following disadvantages: (1) the linkages formed between CNBr-activated hydroxyl containing polymers and the amino groups of ligands which are reacted with the activated polymers are labile; (2) the reaction between the activated polymer and ligand frequently results in the introduction of charged species which interfere with utilization of the reaction product in affinity absorption; and (3) CNBr is a noxious lachrimatory and poisonous chemical which requires special care in its handling.

Efforts to find another method other than the CNBr method for coupling ligands to hydroxyl containing polymers resulted in the use of a number of different reagents including triazine trichloride, N-hydroxy succinimide, 1,1-carbonyldiimidazole and certain epoxy compounds. A method for preparing covalent chromatographic matrices utilizing a hydroxyl containing polymer which has been activated by reaction with 2-fluoro-1-methylpyridinium toluene-4-sulfonate (FMP) has been described in U.S. Pat. No. 4,582,875, assigned to the same assignee as this invention. However, covalently binding a biologically active substance containing, for example, amino, thiol, or hydroxyaryl groups directly to a polymeric substance may result in steric problems and affect the biological activity of the covalently bound substance.

A spacer, that is, an organic compound, which can be placed between the polymer surface and the ligand, helps to overcome the steric hindrance due to close proximity of the bound ligand to the polymer matrix. Both straight chain spacers and branched chain spacers have been used for this purpose. In P. V. Sundaram, "Potentials of Enzymes Attached to Nylon Tubes in Analysis," *Biomedical Applications of Immobilized Enzymes and Proteins*, Vol. 2, T. M. S. Chang, Ed., pp. 317-340, Plenum Press, New York (1977), use of a polylysine spacer is illustrated (at page 323).

In W. E. Hornby, G. A. Noy and A. B. B. Salleh, "Application of Immobilized Enzymes in Analysis", *Biotechnological Applications of Proteins and Enzymes*, Z. Bohak and N. Sharon, Ed., pp. 267-278, Academic Press, New York (1977), the use of pectinamine, a polyamine derived from 1,3-diaminopropan-2-ol and pectin, for the covalent attachment of enzymes, is shown (at page 271).

U.S. Pat. No. 4,152,411 describes the preparation and use of a marked spine diagnostic tool, for example, one containing thyroxine, poly-1-lysine and horseradish peroxidase.

The spacer arm concept is discussed in I. Parikh and P. Cuatrecasas, "Affinity Chromatography", *Chem. Eng. News*, Aug. 26, 1985, pp. 17-32. In this reference, the use of both short alkyl chain spacer arms, such as hexamethylenediamine, and branched copolymers of lysine and alanine as polyfunctional anchoring spacers is disclosed.

OBJECTS

It is a principal object of the present invention to provide a chromatographic matrix which can be used with a wide variety of organic ligands.

It is another object of this invention to provide an affinity chromatography matrix which contains a spacer.

It is another object of this invention to provide a means for chromatographing sensitive biological materials without adversely affecting the biological activity of such material.

Other objectives and advantages of the present invention will become apparent in the course of the following detailed description.

SUMMARY

The present invention provides a matrix useful in affinity chromatography and ligand immobilization and a process for preparing the same which involves the use of a polymeric non-biologically active spacer. The spacer used is polyethyleneimine. The matrix of the present invention is prepared by a process which includes the steps of reacting a hydroxyl containing polymer with 2-fluoro-1-methylpyridinium toluene-4-sulfonate (FMP) to form an activated polymer wherein at least some of the hydroxyl groups of the polymer have been substituted to form 1-methyl-2-pyridoxy toluene-4-sulfonate groups, and reacting the 1-methyl-2-pyridoxy substituted polymer with polyethyleneimine to form an affinity chromatographic matrix in which at least some of the 1-methyl-2-pyridoxy groups of the polymer have been replaced by polyethyleneimine.

DESCRIPTION OF THE PREFERRED EMBODIMENT

The present invention provides the means for immobilizing and covalently chromatographing a wide variety of organic ligands, such as enzymes, nucleoproteins, antigens, antibodies, haptens, hormones, vitamins, polypeptides and other biologically active compounds. Ligands having biological activity may under ordinary circumstances be subject to loss of biological activity due to steric interactions with chromatographic matrices. Use of a polyethyleneimine spacer can prevent such loss. Ligands which contain electrophilic groups capable of reacting with a polyethyleneimine can be readily chromatographed by this method. Such ligands include acylating agents such as carboxylic acids, acyl halides, sulfonyl halides, N-hydroxysuccinimides, active esters such as p-nitrobenzoates, imidoesters, aldehydes, epoxides, thioepoxides, divinylsulfones and the like. Where the ligand of interest does not contain such groups or the group in question is itself involved in the biological activity of the ligand, for example, where such group is at or near the active site of an enzyme, it may be desirable to derivatize the polyethyleneimine spacer to provide functional groups with which the ligand is capable of reacting without affecting its biological activity.

The invention will be described in detail with reference to FIGS. 1 and 2, wherein there are shown the various steps involved in the overall reaction scheme.

Figure 1:
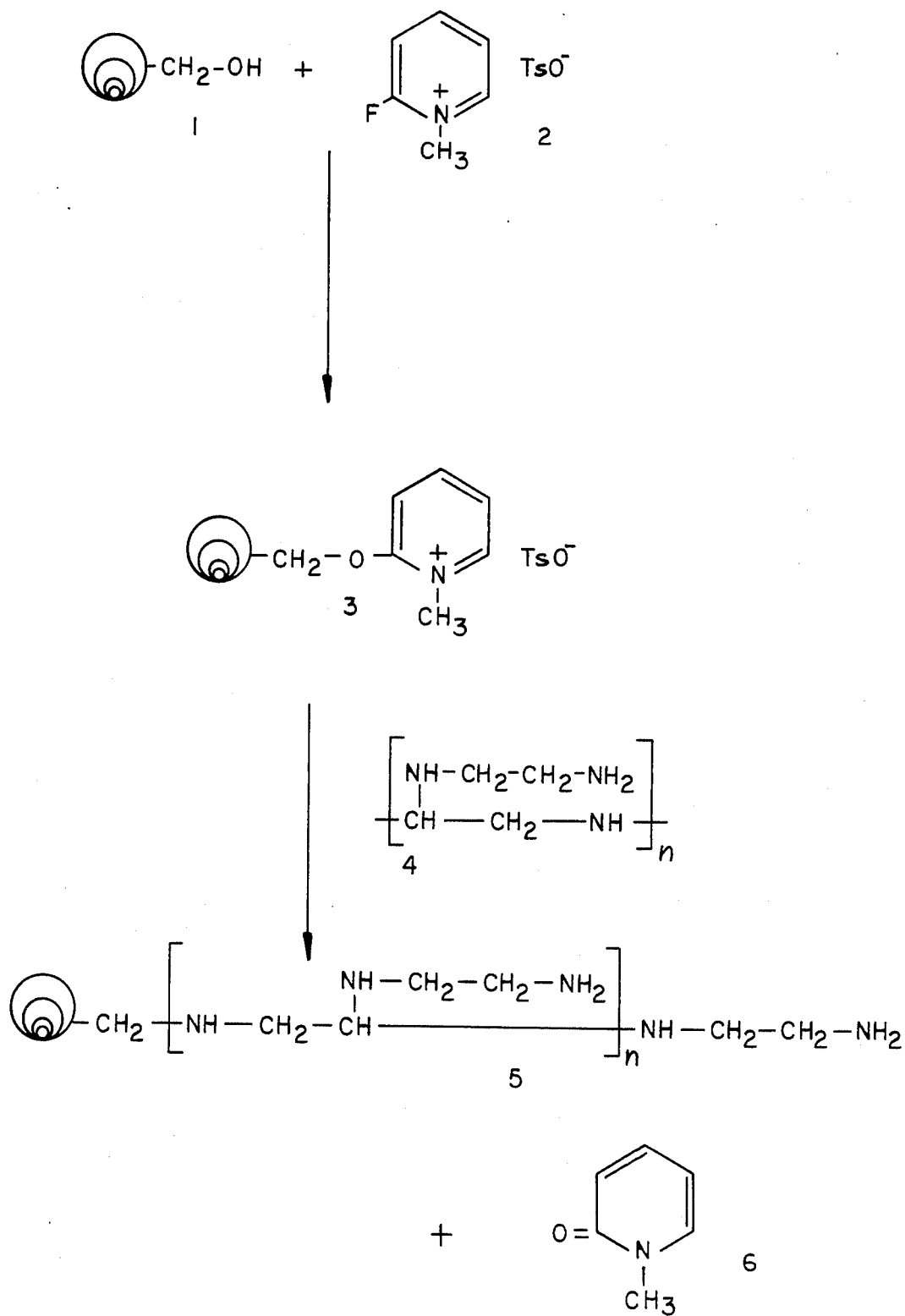
FIG. 1 of the drawings is a schematic flow sheet illustrating the preparation of the polymeric matrix of the present invention.
Figure 2:
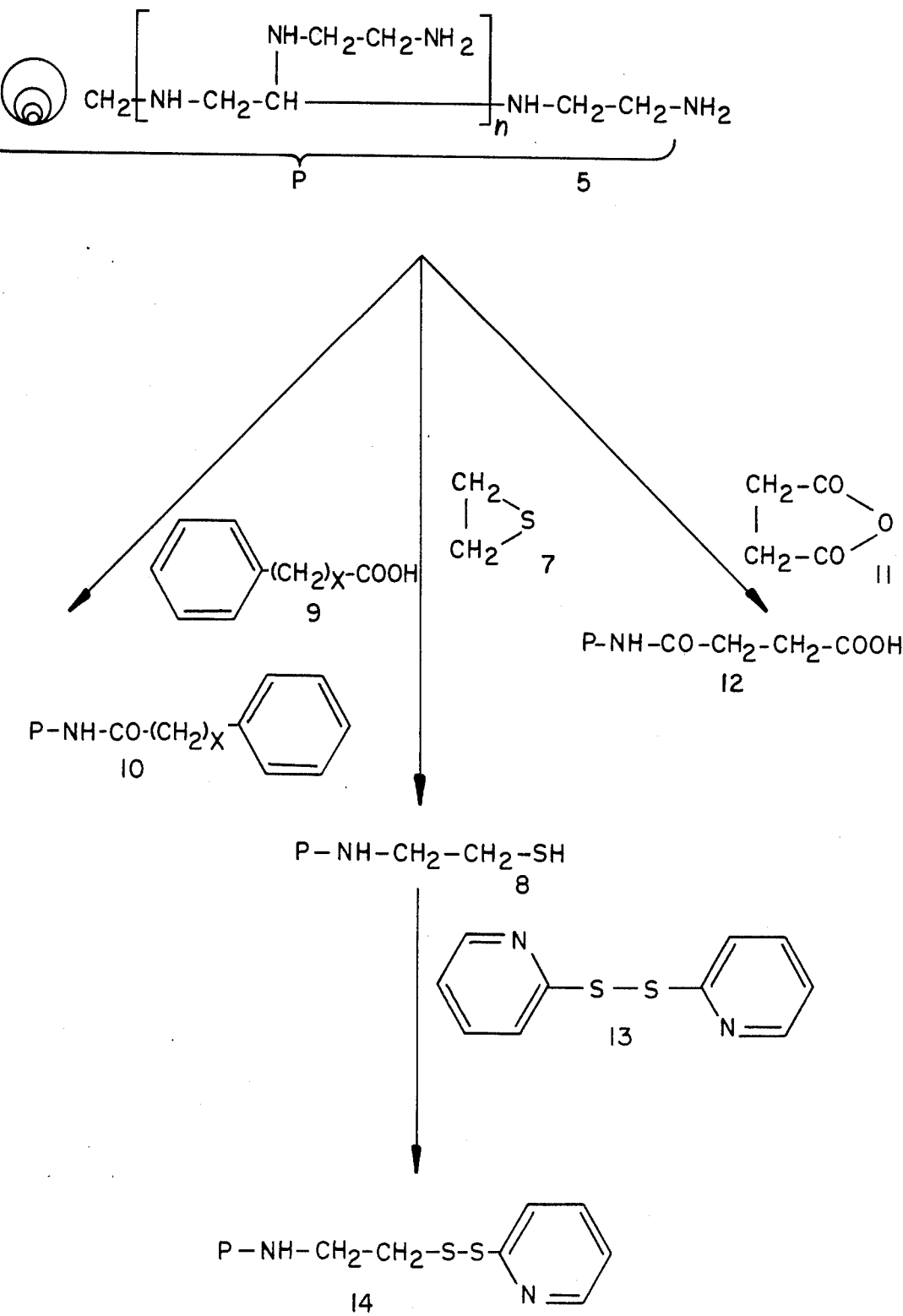
FIG. 2 is a schematic flow sheet illustrating various derivatizing reactions utilizing the matrix of the present invention.

The first step in the process is the reaction of a hydroxyl containing polymer having at least one reactive hydroxyl group (Formula 1) with 2-fluoro-1-methyl-pyridinium toluene-4-sulfonate (Formula 2), as shown in FIG. 1.

Many polymeric materials can be used as long as they contain at least one reactive hydroxyl group. Principal among the polymers which may be used are the polysaccharides, such as the celluloses, including paper; dextrans and cross-linked dextrans; and agaroses and cross-linked agaroses. Other polymeric materials which can be used include natural, semi-synthetic and synthetic materials containing hydroxyl groups such as polyethylene glycols; polyvinyl alcohols, for example, FRACTOGEL TSK, a porous, semi-rigid spherical gel synthesized from hydrophilic vinyl polymer and composed exclusively of C, H and 0 atoms, supplied by E. Merck, Darmstadt, Germany; polyacrylates, such as polyhydroxymethyl methyl acrylates or TRISACRYL GF 2000, a polymer of N-acryloyl-2-amino-2-hydroxymethyl-1,3-propanediol, manufactured by Reactifs IBF, France; glycophase glass and silica particles having bonded groups containing at least one hydroxyl group bonded to a carbon atom. Hereinafter, the polymer will sometimes be referred to as a gel. The polymer may be provided in the form of beads, if desired, or in any other convenient form.

Other 2-halo-1 methylpyridinium salts than FMP, such as 2-chloro-1-methylpyridinium salts, can be used, but the 2-fluoro-1-methylpyridinium salts are preferred because of their greater reactivity.

The reaction between the hydroxyl containing polymer and FMP or other 2-halo-1-methylpyridinium salt can be conducted in an aqueous solution or any polar organic solvent such as acetonitrile, acetone, dimethyl formamide or tetrahydrofuran in the presence of a base such as a tertiary amine, for example, triethylamine (TEA) or tributylamine (TBA). Under mild conditions of ambient temperature and pressure, the reaction between the hydroxyl containing polymer and FMP takes place rapidly and smoothly, going to completion in about 1-15 minutes. The resulting 2-alkoxy-1-methyl-pyridinium salt (Formula 3) will be referred to at times as the activated polymer or activated gel. The activated polymer is readily attacked by nucleophiles, such as polyethylenemine (Formula 4), since the 1-methyl-2-pyridoxy group is a good leaving group, being readily converted to 1-methyl-2-pyridone (Formula 6) upon nucleophilic substitution.

The reaction of the 2-alkoxy-1-methylpyridinium salt (Formula 3) with polyethyleneimine (Formula 4) is illustrated in FIG. 1. Polyethyleneimines varying in molecular weight from about 600 to 100,000 can be used. Molecular weights in the range of about 1,000 to 20,000 are preferred. Polyethyleneimines also vary with respect to the degree of branching. As the degree of branching increases, the number of amino groups available for further reaction increases. In Formulae 4 and 5 only one such branch is shown. The reaction is conducted in a suitable polar organic solvent such as acetonitrile, acetone or tetrahydrofuran. The resulting product contains a terminal amino group and will sometimes be referred to herein as an amino-terminal gel.

Where the ligand of interest contains an electrophilic group which is capable of reacting with an amino group of the amino-terminal gel, the unmodified amino-terminal gel can serve as a affinity chromatographic matrix for such electrophilic ligand. On the other hand, where the ligand of interest does not contain groups which are readily reacted with an amino group of the polyethyleneimine, for example, where the ligand itself contains reactive amino groups, it may be desirable to further derivatize the amino-terminal gel, by reaction with a suitable derivatizing agent or electrophilic ligand, to provide groups on the gel which can be readily reacted with the active functional groups of the ligand of interest as shown in FIG. 2.

The amino-terminal gel, for example, can readily be converted to a thiol gel (Formula 8) by reaction with ethylene sulfide (Formula 7). The thiol gel can be activated by reaction with 2,2-dithiopyridine (Formula 13) to produce an activated thiol gel (Formula 14) which can be used as a chromatographic matrix for sulfhydryl containing ligands, such as sulfhydryl containing enzymes. Conversion to a phenyl-terminal gel (Formula 10) by reaction of the amino-terminal gel with an aralkyl carboxylic acid (Formula 9) or to a carboxy-terminal gel (Formula 12) by reaction with a suitable anhydride such as succinic anhydride (Formula 11), is also readily accomplished. Each of these and other derivatized amino-terminal gels can then be used as affinity chromatographic matrices for the appropriate ligand.

It should be noted that in Formulae 8, 10 and 12 a product is shown in which reaction with the derivatizing agent has taken place at the terminal primary amino group of the amino-terminal gel depicted in Formula 5. However, reaction of the derivatizing agent with the amino-terminal gel may take place at any available primary or secondary amino group The invention will be better understood with reference to the following examples which are intended for purposes of illustration and are not to be construed as in any way limiting the scope of the present invention, which is defined in the claims appended hereto.

EXAMPLE 1

Activation of SEPHAROSE CL-4B with 2-Fluoro-1-methylpyridinium Toluene-4-sulfonate (FMP) in Aqueous Solution SEPHAROSE CL-4B, a cross-linked agarose gel from Pharmacia Fine Chemicals, Uppsala, Sweden, (5 ml.) was washed five times with 200 ml. distilled water each time. The washed gel was suspended in 5 ml. distilled water which contained 1.2 mmoles 4-dimethylaminopyridine. The gel suspension was stirred at room temperature for 5 minutes. To this suspension was then added 1.0 mmole FMP. The gel was continuously stirred for another 15 minutes and then washed with 200 ml. distilled water five times, with 200 ml. 1M NaCl five times and with 200 ml. distilled water five times.

EXAMPLE 2

Activation of TRISACRYL GF 2000 Gel with 2-Fluoro-1-methylpyrrdinium Toluene-4-sulfonate (FMP) in Acetone Prior to the activation with FMP, TRISACRYL GF 2000 gel (1200 ml.) was washed successively with: $5 \times 1600$ ml. distilled water; $3 \times 1600$ ml. ethyl alcohol; and 1600 ml. dry acetone. After removing excess acetone by vacuum filtration, the gel was suspended in 1600 ml. dry acetone and stirred for 10 minutes. The gel was washed one more time with 1600 ml. dry acetone and excess solvent was removed by vacuum filtration. The dry gel was first placed in a drying oven at 80 degrees Celsius for 5 hours and then in an 80 degrees Celsius vacuum oven for 14 hours. The dry gel was suspended in 500 ml. dry acetone containing 2.6 ml. dry triethylamine (TEA), mixed with 50 g. FMP and 75 ml. TEA in 750 ml. dry N,N-dimethyl formamide (DMF), and stirred at room temperature for 0.5–3 hours. After filtering off the unreacted FMP, the gel was washed with 1 l. dry DMF and suspended in 1 l. dry DMF with stirring for 10 minutes. The FMP-activated gel was then washed successively with: $2 \times 1000$ ml. dry acetone; 1000 ml. acetone containing 4 mM HCl; $2 \times 1000$ ml. 4 mM HCl; and $2 \times 1000$ ml. dry acetone. The washed FMP-activated gel was dried at room temperature under vacuum.

EXAMPLE 3

Activation of FRACTOGEL TSK with 2-Fluoro-1-methylpyridinium Toluene-4-sulfonate (FMP) in Dimethyl Formadide (DMF)

A quantity of 6 g. of dry FRACTOGEL TSK HW 75 (F) was suspended in 25 ml. dry DMF containing 2 mmoles (244 mg.) of 4-dimethylaminopyridine. To this suspension was added 20 ml. of dry DMF containing 5 mmoles (1.42 g.) FMP and 5.5 mmoles (671 mg.) 4-dimethylaminopyridine. The suspension was stirred at room temperature for 1–2 hours. The activated gel was then washed successively with $4 \times 250$ ml. of DMF and $3 \times 250$ ml. dry acetone. The washed activated gel was dried at room temperature under vacuum and stored at 4 degrees Celsius.

EXAMPLE 4

Activation of Filter Paper with 2-Fluoro-1-methylpyridinium Toluene-4-sulfonate (FMP) in Dimethyl Formamide (DMF)

Five sheets of Whatman filter paper No. 54, 9 cm. in diameter, were placed in a vacuum oven set at 75 degrees Celsius for 24 hours. After cooling to room temperature, the papers were immersed in a crystallizing dish containing 200 ml. dry DMF. The dish was shaken at 100 rpm for 10 minutes and then the DMF was decanted. To the dish was then added 100 ml. dry DMF containing 4 mmoles 4-dimethylaminopyridine (DMAP), and the dish was shaken at 100 rpm for 5 minutes. Then 100 ml. DMF containing 10 mmoles 2-fluoro-1-methylpyridinium toluene-4-sulfonate (FMP) and 10.1 mmoles DMAP was added to the dish. The dish was shaken at 100 rpm for 2 hours at room temperature. After removing the solution, 250 ml. dry DMF was added, and the dish was shaken at 100 rpm for 10 minutes. This washing procedure was repeated 2 more times. After decanting the DMF, 250 ml. dry acetone was added to the papers in the dish and the dish was shaken at 100 rpm for 10 minutes. This process of washing with dry acetone was repeated 2 more times. Finally, the papers were air-dried at room temperature and then stored desiccated at 4 degrees Celsius.

EXAMPLE 5

Preparation of Amino-terminal Gel

A quantity of 14 g. of polyethyleneimine, MW 1800, was dissolved in 100 ml. acetonitrile. To this solution was added 20 g. of the FMP-activated gel of Example 2. The resulting suspension was stirred at room temperature for 15–24 hours. The gel was then removed from the suspension, resuspended in 200 ml. distilled water and stirred at room temperature for one hour. The last process was repeated 2 more times. Then the gel was washed successively with: $3 \times 1000$ ml. distilled water; $3 \times 1000$ ml. 1M NaCl; $3 \times 1000$ ml. distilled water; $3 \times 600$ ml. acetonitrile and $3 \times 600$ ml. dry acetone. The resulting amino-terminal gel was dried at room temperature under vacuum.

EXAMPLE 6

Preparation of Thiol Gel

A quantity of 20 g. of amino-terminal gel in its dry form prepared according to the procedure of Example 5 was suspended in 120 ml. of dry acetone. To this suspension was added 4 ml. ethylene sulfide. The resulting mixture was stirred at room temperature for 18 hours. The gel was then washed successively with: $3 \times 1000$ ml. distilled water; $3 \times 600$ ml. acetone; $3 \times 1000$ ml. distilled water; $3 \times 1000$ ml. acetone; $3 \times 1000$ ml. 1M NaCl; $3 \times 1000$ ml. distilled water and $3 \times 600$ ml. acetone.

The thiol gel can itself be used as an affinity chromatographic matrix or can be activated by treatment with 2,2-dithiopyridine for use with ligands containing free sulfhydryl groups.

EXAMPLE 7

Preparation of Activated Thiol Gel

The filtered thiol gel of Example 6 was suspended in 100 ml. of 20 mM dithiothreitol and stirred for 2 hours. The thiol gel was washed with $3 \times 1000$ ml. distilled water; 3×1000 ml. 1M NaCl, 3×600 ml. acetone and 2×500 ml. of a mixture of acetone and 0.05M sodium bicarbonate containing 1 mM EDTA (40–60 v/v). The washed gel was suspended in 40 ml. 0.3M 2,2-dithiopyridine and stirred for 24–48 hours. The activated thiol gel was washed successively with 3×600 ml. of 60% acetone; 5×400 ml. 1 mM EDTA and 5×1000 ml. 0.5M NaCl. The activated thiol gel was stored in phosphate buffered saline at 4 degrees Celsius.

The activated thiol gel can be used, for example, to immobilize enzymes containing free sulfhydryl groups such as jack bean urease or beta-galactosidase.

EXAMPLE 8

Preparation of Phenyl Gel

4-Phenylbutyric acid, 3284 mg. (20 mmoles); N-hydroxysuccinimide, 2300 mg. (20 mmoles); N,N-dicyclohexylcarbodiimide, 4130 mg. (25 mmoles) and 25 ml. dry triethylamine were dissolved in 300 ml. dry DMF and stirred at room temperature for 20 hours. After removing the precipitate, the supernatant was added to 20 g. of the dry amino-terminal gel of Example 5, which was suspended in 100 ml. dry acetone and 7 ml. dry triethylamine and stirred at room temperature for 24 hours. Then the gel was successively washed with: 5×200 ml. DMF; 5×200 ml. 0.5M NaCl in 1 mM NaOH; 5×200 ml. 0.5M NaCl in 1 mM HCl: 5×200 ml. 1 mM NaOH and 5×200 ml. distilled water. After washing, the gel was stored in 0.01M sodium phosphate buffer, pH 7.0, containing 1M ammonium sulfate.

The phenyl gel, having a hydrophobic chain sterically removed from the polymeric carrier, can be used to purify proteins such as serum albumins.

EXAMPLE 9

Preparation of Carboxy-Terminal Gel

A quantity of 45 g. of the amino-terminal gel of Example 5 was suspended in 300 ml. tetrahydrofuran. To this suspension was added 3 mmoles (0.37 g.) 4-dimethylaminopyridine; 15 mmoles (1.5 g.) succinic anhydride and 4.5 ml. triethylamine. The suspension was stirred at room temperature for 24 hours. The gel was washed successively with: 5×30 ml. distilled water; 2×600 ml. 0.5M NaCl and 5×300 ml. distilled water. The gel was stored suspended in phosphate buffered saline at 4 degrees Celsius.

The carboxy-terminal gel can be used as an affinity chromatographic matrix for the purification of amino group containing ligands such as enzymes, antigens, antibodies, haptens, proteins, nucleoproteins, hormones and vitamins.

The foregoing description of the invention has been directed to particular preferred embodiments for purposes of explanation and illustration. It will be apparent, however, to those skilled in the art, that many modifications and changes in the particular methods, materials and methods of use may be made without departure from the scope and spirit of the invention. It is applicant's intention in the following claims to cover all such equivalents, modifications and changes that fall within the true spirit and scope of the invention.

What is claimed is:

1. A process for preparing an affinity chromatographic matrix comprising the steps of:
    reacting a polymeric substance containing at least one hydroxyl group with 2-fluoro-1-methylpyridinium toluene-4-sulfonate to form an activated polymer wherein at least some of the hydroxyl groups of said polymer have been converted to 1-methyl-2-pyridoxy groups; and
    reacting said 1-methyl-2-pyridoxy substituted polymer with polyethyleneimine to form an affinity chromatographic matrix in which at least some of the 1-methyl-2-pyridoxy groups have been replaced by said polyethyleneimine.

2. A process according to claim 1 wherein said polymeric substance is a polysaccharide.

3. A process according to claim 2 wherein said polysaccharide is a dextran.

4. A process according to claim 2 wherein said polysaccharide is a cross-linked dextran.

5. A process according to claim 2 wherein said polysaccharide is an agarose.

6. A process according to claim 2 wherein said polysaccharide is a cross-linked agarose.

7. A process according to claim 2 wherein said polysaccharide is cellulose.

8. A process according to claim 1 wherein said polymeric substance is in the form of a gel.

9. A process according to claim 1 wherein said polymeric substance is a polymer of N-acryloyl-2-amino-2-hydroxymethyl-1,3-propanediol.

10. A process according to claim 1 wherein said polymeric substance is a polyvinyl alcohol.

11. A process according to claim 1 wherein said polymeric substance is paper.

12. A process according to claim 1 wherein said polymeric substance is reacted with said 2-fluoro-1-methylpyridinium toluene-4-sulfonate in aqueous solution.

13. A process according to claim 1 wherein said polymeric substance is reacted with said 2-fluoro-1-methylpyridinium toluene-4-sulfonate in a polar organic solvent.

14. A process for preparing an affinity chromatographic matrix comprising the steps of:
    reacting a polymeric substance containing at least one hydroxyl group with 2-fluoro-1-methylpyridinium toluene-4-sulfonate to form an activated polymer wherein at least some of the hydroxyl groups of said polymer have been converted to 1-methyl-2-pyridoxy groups;
    reacting said 1-methyl-2-pyridoxy substituted polymer with polyethyleneimine to form a polyethyleneimine substituted polymer in which at least some of the 1-methyl-2-pyridoxy groups of said activated polymer have been replaced by said polyethyleneimine; and
    reacting said polyethyleneimine substituted polymer with an electrophilic ligand capable of reacting with an amino group of said polyethyleneimine-substituted polymer.

15. A process according to claim 14 wherein said electrophilic ligand is a aralkyl carboxylic acid.

16. A process according to claim 14 wherein said electrophilic ligand is ethylene sulfide.

17. A process according to claim 14 wherein said electrophilic ligand is ethylene sulfide and the product of reaction of said polyethyleneimine substituted polymer with ethylene sulfide is reacted with 2,2-dithiopyridine.

18. A process according to claim 14 wherein said electrophilic ligand is a carboxylic acid anhydride.

19. An affinity chromatographic matrix prepared according to the process of claim 1.

20. An affinity chromatographic matrix prepared according to the process of claim 14.

21. An affinity chromatographic matrix prepared according to the process of claim 15.

22. An affinity chromatographic matrix prepared according to the process of claim 16.

23. An affinity chromatographic matrix prepared according to the process of claim 17.

24. An affinity chromatographic matrix prepared according to the process of claim 18.

* * * * *